Feb. 26, 1957 K. A. BELK 2,783,056
OPERATOR PROTECTING FRAME FOR TRACTORS
Filed Dec. 2, 1953
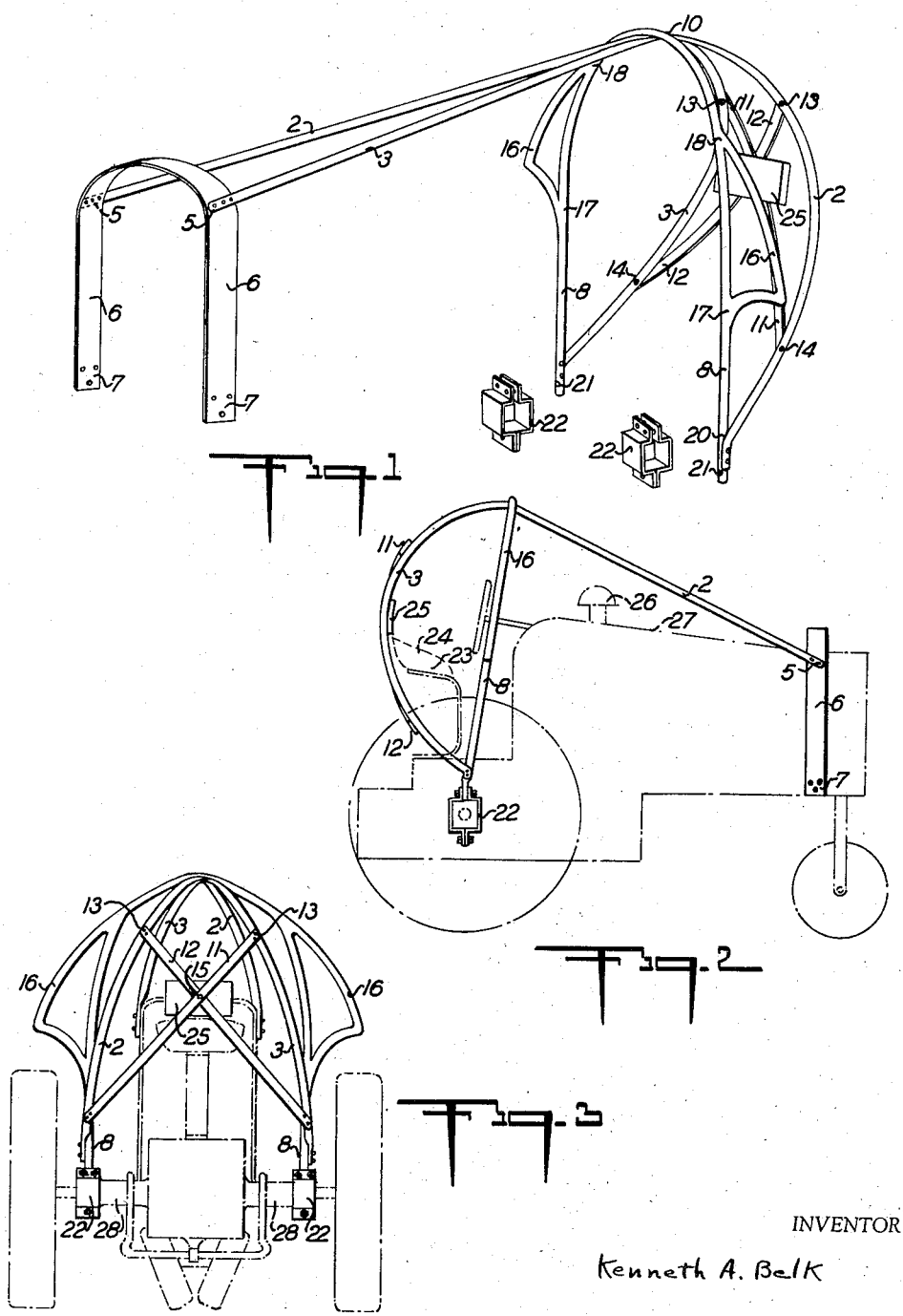
INVENTOR
Kenneth A. Belk
BY Fisher + Christen,
ATTORNEYS

United States Patent Office 2,783,056
Patented Feb. 26, 1957

2,783,056
OPERATOR PROTECTING FRAME FOR TRACTORS

Kenneth A. Belk, Fort Madison, Iowa

Application December 2, 1953, Serial No. 395,718

8 Claims. (Cl. 280—150)

This invention relates to a protective frame for vehicles. More particularly, my invention concerns a frame for a tractor adapted to shield the operator and the upper body of the tractor in the event that the tractor overturns.

Farm tractors, and vehicles of similar construction, because of the nature of their use, are sometimes overturned, resulting in injury to the operator and the tractor itself. When working on uneven or hilly terrain, the danger of the vehicle overturning is ever present and such danger is increased when the ground becomes muddy and slippery from rain or irrigation. Under the foregoing conditions, tractors have been known to turn over backwards, as well as on their sides.

Protective frames and canopies of various constructions have previously been invented to either protect the operator of the tractor from the sun or the slapping and scratching effect of brush, twigs and branches. Other devices have been invented to protect the occupants of motor vehicles in the event that the vehicle overturns. However, these devices either employ a great number of rods or bars to add strength to the device, or they are constructed with few supports, so that they could not possibly supply the needed structural strength. The former type is objectionable since it is cumbersome, obstructive and expensive to manufacture, whereas the latter type is objectionable to the extent that it will not withstand the weight of the vehicle should it overturn. These prior devices also neglect to provide adequate protection for the front upper body of the vehicle should it be overturned. Various structure atop the front portion of the tractor is subject to being mashed, dented or made completely inoperative under the weight of the inverted tractor.

Accordingly, an object of my invention is to provide a protective frame for the top of a tractor or utility vehicle which will be of the most simple construction and at the same time of adequate strength to bear the weight of the tractor should it overturn.

Another object of my invention is to provide a protective frame for a vehicle which will allow an operator easy access to and from the operating position and will not obstruct his view from said position.

A further object of my invention is to provide a protective frame for a tractor or vehicle which will have sufficient strength to withstand the strain of the weight of a tractor when it rolls over backwards.

A still further object of my invention is to provide a protective frame for a tractor which will protect the entire top body portion of the tractor should it overturn.

Another object of my invention is to construct a protective frame for a tractor which will be easily adapted to various models of tractors or utility vehicles.

To accomplish these and other objects of my invention, I provide a protective frame for a tractor comprising a bracket secured to the front portion of said tractor, a pair of frame members secured at their front ends to the bracket and extending upwardly and rearwardly from said bracket, the frame members intersecting at a point substantially midway of their length, said frame members extending rearwardly and arcuately downwardly from the intersection of said frame members, means for securing the rearward ends of said pair of frame members to the rear of said tractor, and a U-shaped support member adapted to be secured at its ends to the rear portion of the tractor adjacent the rearward ends of said pair of frame members, the bight of said U-shaped support intersecting said pair of frame members at their intersection and rigidly secured thereto.

My invention further comprises such a protective frame wherein said bracket has a substantially inverted U shape, and its ends are rigidly fastened to the front portion of the tractor chassis at each side thereof. Furthermore, my invention comprises a protective frame wherein crossed brace bars are secured at their upper and lower ends to the arcuately extending portions of the frame members, and outwardly extending members are secured to each side of said U-shaped support member adjacent the rear wheels of the tractor, whereby frame obtains a basket-like shape extending over the rear wheels of the tractor. I further provide means for securing the rear ends of said pair of frame members to the rear axle housing of said tractor.

The foregoing objects and others will be apparent upon consideration of the accompanying drawing and specification of which:

Fig. 1 is an isometric view of my invention before mounting on a tractor;

Fig. 2 is a perspective side view of my invention mounted on a tractor; and

Fig. 3 is a perspective rear view of my invention mounted on a tractor.

In Fig. 1, frame members comprising bars 2 and 3 are rigidly connected at 5 to U-shaped bracket 6. Bars 2 and 3 proceed gradually upwardly converging and crossing at 10. Thereupon, bars 2 and 3 diverge and bend downwardly forming a rather semicircular arc and respectively joining inverted U-shaped bar 8 at its opposite ends 20 where they are rigidly fastened by welding or bolting.

Inverted U-shaped bar 8 also joins bars 2 and 3 at its apex or bight at 10 and all three are rigidly secured as by welding or bolting.

Brace bars 11 and 12 are seen crossing one another and rigidly connected at 15 at the rear of the canopy. The top ends of bars 11 and 12 are connected at 13 to bars 3 and 2 respectively and the bottom of bars 11 and 12 are likewise rigidly connected at 14 to bars 2 and 3 respectively. These brace bars 11 and 12 give added strength and support to the structure and added protection to the occupant, particularly in the event the tractor topples over backward.

Outwardly extending wing-like structures are formed by bars 16 and are suitably secured to bar 8 at 18 as by welding or formed as a continuous bar extending along and rigidly secured to the apex of bar 8 so that both wing-like structures 16 consist of a single continuous bar. The lower ends of bars 16 are rigidly secured to bar 8 at 17.

These wing-like appendages constructed from bars 16 overlie the tops of the rear tractor wheels and serve to further protect the driver, allow for an easy roll-over should the tractor overturn and facilitate righting the tractor when it is on its side.

In Fig. 2, my invention is shown mounted on a tractor. In tractor seat 23 is shown slits or openings through which a safety belt for the operator may be mounted.

Back rest 25 is shown connected to cross bars 11 and 12 and may be in the form of padding of the cross bars or a simple back rest connected thereto. At 26 is shown a vent and at 27 the sheet metal hood of the tractor, both of which are subject to damage should the tractor overturn. Bars 2 and 3 give adequate protection to such superstructure atop the tractor to prevent damage to them.

Bracket 6 is solidly fastened to the tractor frame at 7. Bars 2, 3 and 8 at their juncture 20 are rigidly secured to the axle housing 28 by clamp members 22 utilizing bolt holes 21.

In Fig. 3, a view of the rear of the structure shows how its basket-like shape would protect the driver and machine should it overturn. It is also obvious that a sun and rain shield in the form of a section of a sphere of canvas material could be adapted to cover this structure.

The term bars in this specification is meant to apply broadly and could include bars, strips, tubing, pipe or rods or any material capable of performing similar results.

It is also seen that my invention could easily be modified to fit many other types of utility vehicles. Therefore, although the preferred embodiment of my invention has been illustrated and described in detail, it will be apparent that modifications and changes may be made therein without departing from the scope of the invention as defined in the appended claims.

I claim:

1. A protective frame for a tractor comprising a bracket adapted to be secured to the front portion of said tractor, a pair of frame members secured at their front ends to said bracket and extending upwardly and rearwardly from said bracket, said frame members intersecting at a point generally above the operator's position, said frame members extending rearwardly and arcuately downwardly from the intersection of said frame members, said arcuately extending portion protruding to the extreme rear of said tractor, means for securing the rearward ends of said pair of frame members to the rear of said tractor and a U-shaped support member adapted to be secured at its ends to the rear portion of the tractor adjacent the rearward ends of said pair of frame members, the bight of said U-shaped support intersecting said pair of frame members at their intersection and rigidly secured thereto.

2. A protective frame for a tractor comprising a bracket, said bracket having a substantially inverted U shape and its ends rigidly fastened to the front portion of the tractor chassis at opposite sides thereof, a pair of frame members secured at their front end to said bracket and extending upwardly and rearwardly from said bracket, said frame members intersecting at a point generally above the operator's position, said frame members extending rearwardly and arcuately downwardly from the intersection of said frame members, said arcuately extending portion protruding to the extreme rear of said tractor, means for securing the rearward ends of said pair of frame members to the rear of said tractor and a U-shaped support member adapted to be secured at its ends to the rear portion of the tractor adjacent the rearward ends of said pair of frame members, the bight of said U-shaped support intersecting said pair of frame members at their intersection and rigidly secured thereto.

3. A protective frame for a tractor comprising a bracket adapted to be secured to the front portion of said tractor, a pair of frame members secured at their front ends to said bracket and extending upwardly and rearwardly from said bracket, said frame members intersecting at a point generally above the operator's position, said frame members extending rearwardly and arcuately downwardly from the intersection of said frame members, said arcuately extending portion protruding to the extreme rear of said tractor, means for securing the rearward ends of said pair of frame members to the rear of said tractor, crossed brace bars, said brace bars secured at their upper and lower ends to said arcuate extending portions of said frame members, and a U-shaped support member adapted to be secured at its ends to the rear portion of the tractor adjacent the rearward ends of said pair of frame members, the bight of said U-shaped support intersecting said pair of frame members at their intersection and rigidly secured thereto.

4. A protective frame for a tractor comprising a bracket adapted to be secured to the front portion of said tractor, a pair of frame members secured at their front ends to said bracket and extending upwardly and rearwardly from said bracket, said frame members intersecting at a point generally above the operator's position, said frame members extending rearwardly and arcuately downwardly from the intersection of said frame members, said arcuately extending portion protruding to the extreme rear of said tractor, means for securing the rearward ends of said pair of frame members to the rear axle housing of said tractor, and a U-shaped support member adapted to be secured at its ends to the rear portion of said tractor adjacent the rearward ends of said pair of frame members, the bight of said U-shaped support intersecting said pair of frame members at their intersection and rigidly secured thereto.

5. A protective frame for a tractor comprising a bracket adapted to be secured to the front portion of said tractor, a pair of frame members secured at their front ends to said bracket and extending upwardly and rearwardly from said bracket, said frame members intersecting at a point generally above the operator's position, said frame members extending rearwardly and arcuately downwardly from the intersection of said frame members, said arcuately extending portion protruding to the extreme rear of said tractor, means for securing the rearward ends of said pair of frame members to the rear of said tractor, a U-shaped support member adapted to be secured at its ends to the rear portion of the tractor adjacent the rearward ends of said pair of frame members, the bight of said U-shaped support intersecting said pair of frame members at their intersection and rigidly secured thereto, and outwardly extending members secured to each side of said U-shaped support member adjacent the rear wheels of said tractor whereby the frame obtains a basket-like shape extending over the rear wheels of said tractor.

6. A protective frame for a tractor comprising a bracket, said bracket having a substantially inverted U shape and its ends rigidly fastened to the front portion of the tractor chassis at opposite sides thereof, a pair of frame members secured at the front end of said bracket and extending upwardly and rearwardly from said bracket, said frame members intersecting at a point generally above the operator's position, said frame members extending rearwardly and arcuately downwardly from the intersection of said frame members, said arcuately extending portion protruding to the extreme rear of said tractor, means for securing the rearward ends of said pair of frame members to the rear axle housing of said tractor, crossed brace bars, said brace bars secured at the upper and lower ends to said arcuate extending portions of said frame members, and a U-shaped support member adapted to be secured at its ends to the rear portion of said tractor adjacent the rearward ends of said pair of frame members, the bight of said U-shaped support intersecting said pair of frame members at their intersection and rigidly secured thereto.

7. A protective frame for a tractor comprising a bracket adapted to be secured to the front portion of said tractor, a pair of frame members secured at the front ends to said bracket and extending upwardly and rearwardly from said bracket, said frame members intersecting at a point generally above the operator's position, said frame members extending rearwardly and arcuately downwardly from the intersection of said frame members, said arcuately extending portion protruding to the extreme rear of said tractor, means for securing the rearward ends of said pair of frame members to the rear axle housing of said tractor, crossed brace bars, said brace bars secured at their upper and lower ends to said arcuately extending portions of said frame members, a U-shaped support member adapted to be secured at its ends to the rear portion of the tractor adjacent the rearward ends of said pair of frame members, the bight of said U-shaped support intersecting said pair of frame members at their intersection and rigidly secured thereto, and outwardly extending members secured to each side of said U-shaped support member adjacent the rear wheels of said tractor, whereby the frame obtains a basket-like shape extending over the rear wheels of said tractor.

8. A protective frame for a tractor comprising a bracket, said bracket having a substantially inverted U shape and its ends rigidly fastened to the front portion of the tractor chassis at opposite sides thereof, a pair of frame members secured at the front end of said bracket and extending upwardly and rearwardly from said bracket, said frame members intersecting at a point generally above the operator's position, said frame members extending rearwardly and arcuately downwardly from the intersection of said frame members, said arcuately extending portion protruding to the extreme rear of said tractor, means for securing the rearward ends of said pair of frame members to the rear axle housing of said tractor, crossed brace bars, said brace bars secured at the upper and lower ends to said arcuately extending portions of said frame members, a U-shaped support member adapted to be secured at its ends to the rear portion of said tractor adjacent the rearward ends of said pair of frame members, the bight of said U-shaped support intersecting said pair of frame members at their intersection and rigidly secured thereto, and outwardly extending members secured to each side of said U-shaped support member, said outwardly extending members comprising bars secured at their upper ends to the U-shaped support member adjacent the bight thereof and extending downwardly and outwardly from said support member, the lower ends of said bars extending inwardly and rigidly secured to said U-shaped support member so that said inwardly extending portion of said bars protrude over and are adjacent the top of the rear wheels of the tractor.

References Cited in the file of this patent

UNITED STATES PATENTS

| | | |
|---|---|---|
| 1,200,655 | Scheidemantel | Oct. 10, 1916 |
| 1,247,674 | Hankinson | Nov. 27, 1917 |
| 2,729,462 | Maybrier | Jan. 3, 1956 |

FOREIGN PATENTS

| | | |
|---|---|---|
| 603,466 | France | Jan. 9, 1926 |
| 622,899 | France | Mar. 8, 1927 |